US007869574B2

(12) United States Patent
Steinlage et al.

(10) Patent No.: US 7,869,574 B2
(45) Date of Patent: Jan. 11, 2011

(54) BRAZE ASSEMBLY WITH BERYLLIUM DIFFUSION BARRIER AND METHOD OF MAKING SAME

(75) Inventors: Gregory Alan Steinlage, Hartland, WI (US); Thomas C. Tiearney, Waukesha, WI (US); Donald Robert Allen, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 12/327,255

(22) Filed: Dec. 3, 2008

(65) Prior Publication Data

US 2010/0135466 A1 Jun. 3, 2010

(51) Int. Cl.
*G21K 1/00* (2006.01)
*B23K 1/19* (2006.01)

(52) U.S. Cl. ................................. 378/161; 228/262.31

(58) Field of Classification Search ................. 378/161; 228/262.31, 262.42–262.45, 262.51, 262.72, 228/262.8, 262.9; 427/250; 205/263, 264, 205/261, 283, 266, 271; 438/118; 428/649
See application file for complete search history.

(56) References Cited

U.S. PATENT DOCUMENTS

| | | | | |
|---|---|---|---|---|
| 4,871,108 | A * | 10/1989 | Boecker et al. | 228/122.1 |
| 5,226,067 | A * | 7/1993 | Allred et al. | 378/161 |
| 5,664,723 | A | 9/1997 | Sastri | |
| 6,164,524 | A | 12/2000 | Iwadachi | |
| 6,528,123 | B1 * | 3/2003 | Cadden et al. | 427/404 |
| 6,824,888 | B2 | 11/2004 | Hatano et al. | |
| 7,016,472 | B2 | 3/2006 | Subraya et al. | |

OTHER PUBLICATIONS

Araki et al., "Manufacturing and testing of a Be / OFHC—Cu divertor module," Journal of Nuclear Materials, 1996, pp. 632-637.

* cited by examiner

*Primary Examiner*—Hoon Song
(74) *Attorney, Agent, or Firm*—Ziolkowski Patent Solutions Group, SC

(57) ABSTRACT

A bonded assembly includes a member, and a substrate comprising beryllium, the substrate configured to be bonded to the member. The bonded assembly includes a first barrier applied to a surface of the substrate, a second barrier applied to a surface of the first barrier, a bonding material disposed between the second barrier and the member, and wherein the second barrier is configured to prevent dissolution of the first barrier into the bonding material.

24 Claims, 6 Drawing Sheets

BRAZE ASSEMBLY WITH BERYLLIUM DIFFUSION BARRIER AND METHOD OF MAKING SAME

BACKGROUND OF THE INVENTION

The invention relates generally to x-ray tubes and, more particularly, to a method and apparatus for creating an improved braze in x-ray tube components.

X-ray systems typically include an x-ray tube, a detector, and a gantry to support the x-ray tube and the detector. In operation, an imaging table, on which an object is positioned, is located between the x-ray tube and the detector. The x-ray tube typically emits radiation, such as x-rays, toward the object. The radiation typically passes through the object on the imaging table and impinges on the detector. As radiation passes through the object, internal structures of the object cause spatial variances in the radiation received at the detector. The detector then processes the received data, and the system translates the radiation variances into an image, which may be used to evaluate the internal structure of the object. One skilled in the art will recognize that the object may include, but is not limited to, a patient in a medical imaging procedure and an inanimate object as in, for instance, a package in a computed tomography (CT) package scanner.

X-ray tubes include a rotating anode structure for the purpose of distributing heat generated at a focal spot. The anode is typically rotated by an induction motor having a cylindrical rotor built into a cantilevered axle that supports a disc-shaped anode target and an iron stator structure with copper windings that surrounds an elongated neck of the x-ray tube. The rotor of the rotating anode assembly is driven by the stator. An x-ray tube cathode provides a focused electron beam that is accelerated across a cathode-to-anode vacuum gap and produces x-rays upon impact with the anode. Because of the high temperatures generated when the electron beam strikes the target, it is necessary to rotate the anode assembly at high rotational speed.

X-rays may be produced when high-speed electrons are decelerated when directed from the cathode to the target substrate via an electrical potential difference therebetween. The electrons impact a target track material at a focal point and x-rays emit therefrom. The x-ray tube includes a frame, typically constructed from stainless steel, and has an x-ray window formed therein. The x-ray window is typically made from beryllium, or other low-atomic number material. X-rays are emitted through the beryllium window toward a detector array. The x-ray tube may also include a collector attached to a perimeter of the beryllium window at an interface, wherein the collector absorbs stray electrons from the cathode or the target and conducts heat away from the interface. The collector is typically attached to the beryllium window using a brazing process.

Brazing and soldering are commonly used methods for joining two parts involving heating a fusible material, causing it to melt and wet both parts, and allowing the material to cool and bond the parts. However, diffusion and alloying between the fusible material and the parts being joined may result in formation of brittle intermetallic compounds, sometimes referred to as Laves phase intermetallics, which can weaken the braze joint and cause early life failure of the x-ray tube.

Therefore, it would be desirable to have a method for joining two parts, such as a beryllium window and an electron collector, having improved integrity and hermeticity therebetween.

BRIEF DESCRIPTION OF THE INVENTION

The invention provides an apparatus and method of brazing a first material to a second material having improved integrity and hermeticity therebetween.

According to an aspect of the invention, a bonded assembly includes a member, and a substrate comprising beryllium, the substrate configured to be bonded to the member. The bonded assembly includes a first barrier applied to a surface of the substrate, a second barrier applied to a surface of the first barrier, a bonding material disposed between the second barrier and the member, and wherein the second barrier is configured to prevent dissolution of the first barrier into the bonding material.

In accordance with another aspect of the invention, a method of fusibly joining a substrate and an object includes providing a substrate comprising beryllium, providing an object configured to be fusibly joined to the substrate, depositing a first barrier layer onto a surface of the substrate, wherein the first barrier layer is configured to prevent formation of intermetallics at an interface between the object and the substrate, and depositing a second barrier layer onto a surface of the first barrier layer. The method further includes interposing a fusible material between the second barrier layer and the object, and heating the assembly to a temperature sufficient to create a fuse joint between the substrate and the object via the fusible material.

According to yet another aspect of the invention, an x-ray tube includes a window comprising beryllium, a collector configured to be braze joined to the window, a first diffusion barrier applied to a surface of the window, the first diffusion barrier configured to prevent formation of Laves phase intermetallics, a second diffusion barrier applied to a surface of the first diffusion barrier, and a braze material disposed between the second diffusion barrier and the collector.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
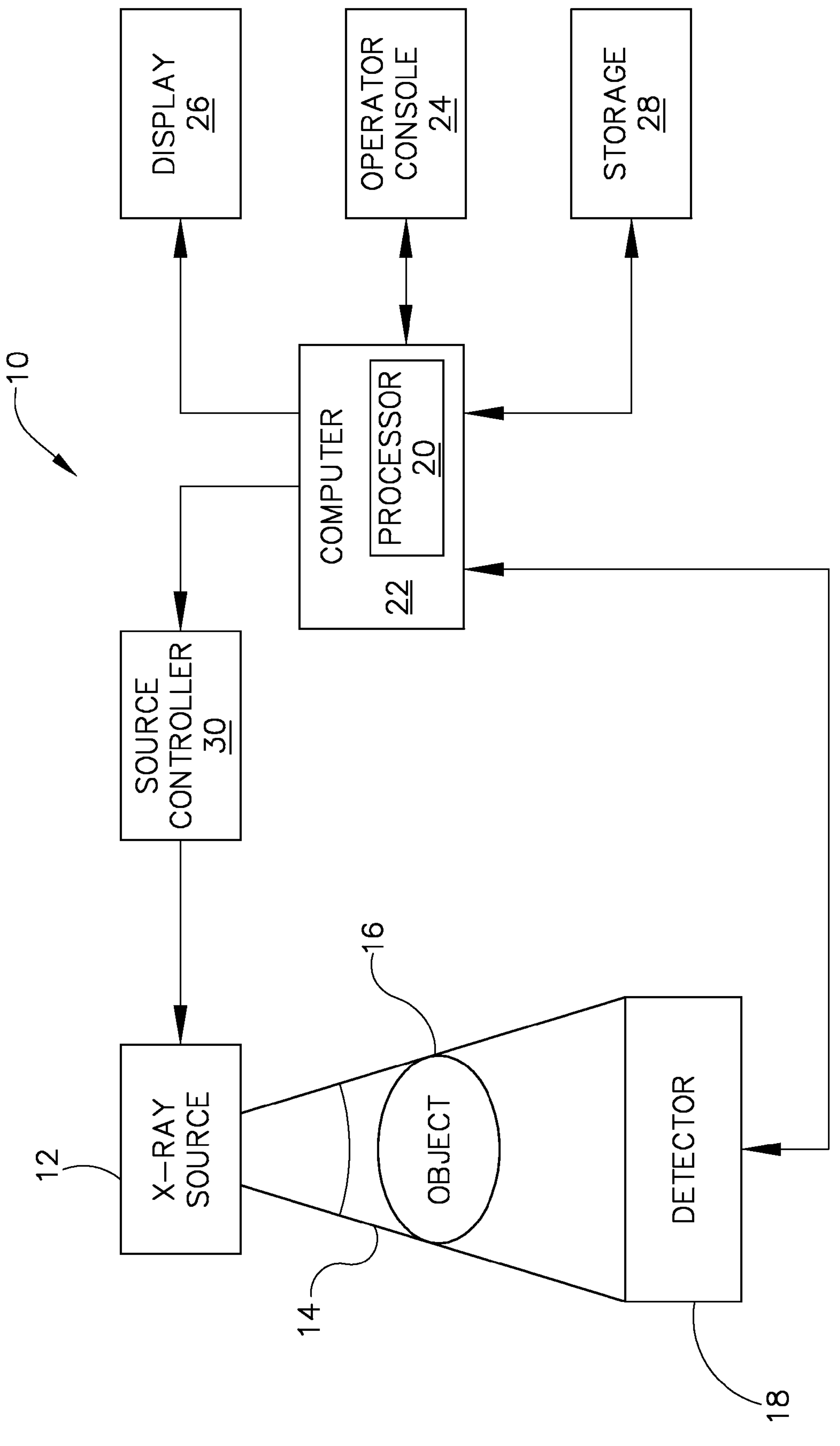
FIG. 1 is a block diagram of an imaging system that can benefit from incorporation of an embodiment of the invention.

FIG. 1 is a block diagram of an embodiment of an imaging system 10 designed both to acquire original image data and to process the image data for display and/or analysis in accordance with the invention. It will be appreciated by those skilled in the art that the invention is applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, x-ray system 10 includes an x-ray source 12 configured to project a beam of x-rays 14 through an object 16. Object 16 may include a human subject, pieces of baggage, or other objects desired to be scanned. X-ray source 12 may be a conventional x-ray tube producing x-rays having a spectrum of energies that range, typically, from 30 keV to 200 keV. The x-rays 14 pass through object 16 and, after being attenuated by the object, impinge upon a detector 18. Each detector in detector 18 produces an analog electrical signal that represents the intensity of an impinging x-ray beam, and hence the attenuated beam, as it passes through the object 16. In one embodiment, detector 18 is a scintillation based detector, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, flash memory, compact discs, etc. The operator may also use console 24 to provide commands and instructions to computer 22 for controlling a source controller 30 that provides power and timing signals to x-ray source 12.

Figure 2:
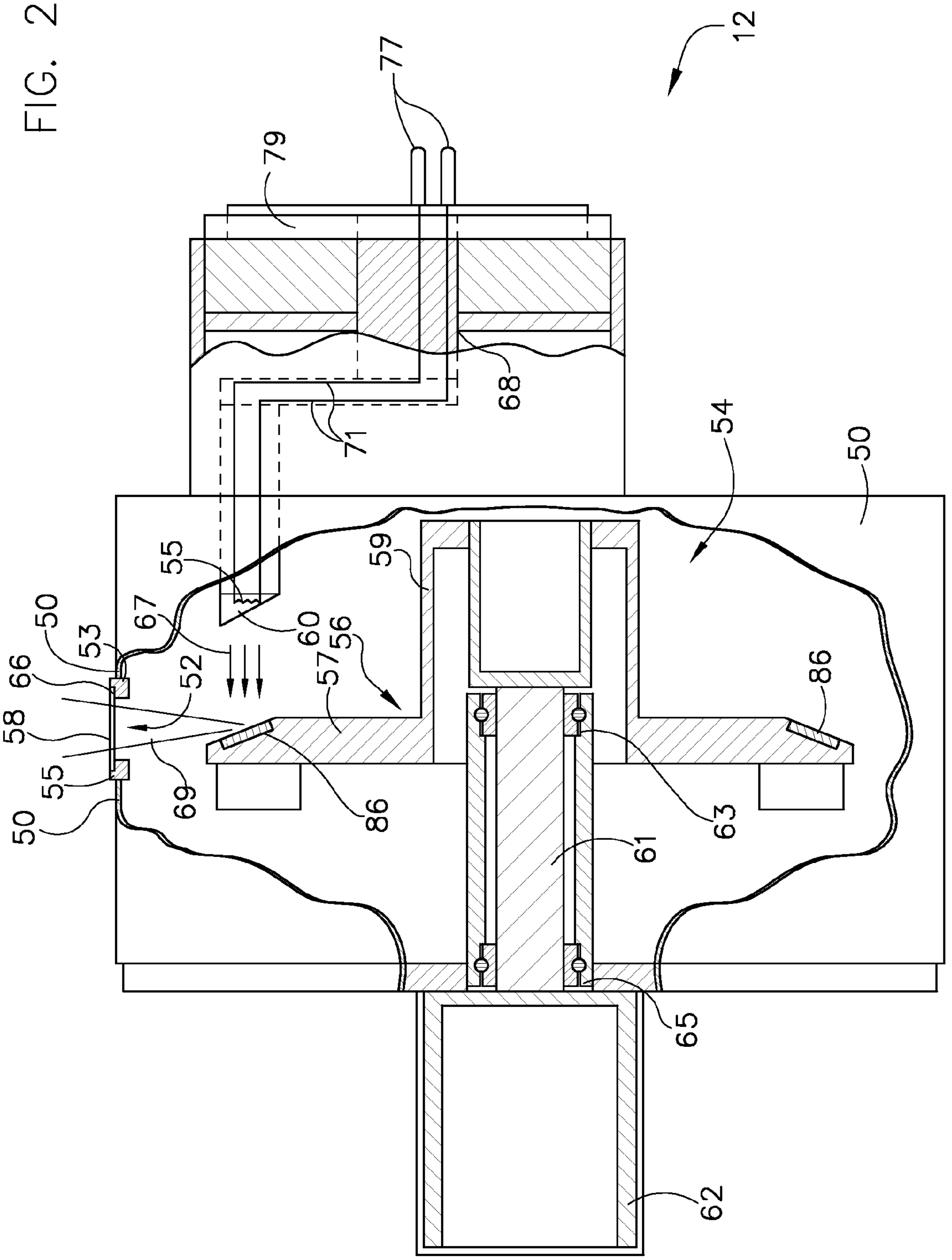
FIG. 2 is a cross-sectional view of an x-ray tube that incorporates embodiments of the invention.

FIG. 2 illustrates a cross-sectional view of an x-ray tube 12 incorporating embodiments of the invention. X-ray tube 12 includes a frame 50 that encloses vacuum region 54, and an anode 56 and a cathode 60 are positioned therein. Anode 56 includes a target 57 having a target track 86, and a target hub 59 attached thereto. Target 56 is attached to a shaft 61 supported by front bearing 63 and rear bearing 65. Shaft 61 is attached to rotor 62. Cathode 60 typically includes a filament 55 coupled to electrical leads 71 that pass through a center post 68. Feedthrus 77 pass through an insulator 79 and are electrically connected to electrical leads 71.

X-ray tube 12 includes an electron collector 53 attached to frame 50. Electron collector 53 includes a window 58 proximate a passageway 52. Collector 53 is typically made of copper and may be joined via a braze or solder joint 66 to window 58. Window 58 is typically made of a low atomic number metal, such as beryllium, to allow passage of x-rays therethrough with minimum attenuation. Joint 66, referred to above as a braze or solder joint, may be formed or fused via either a braze or solder process according to embodiments of the invention. Thus, although the embodiments described below may be referred to as using a braze process, one skilled in the art will recognize that the joints and assemblies described herein may be formed via soldering or brazing, and that such terms in no way imply or limit a temperature at which the joint or assembly is formed. Thus, the terms braze and solder may interchangeably and equally refer to joining or fusing two or more materials by heating an additional material therebetween.

In operation, target 56 is spun via a stator (not shown) external to rotor 62. An electric current is applied to filament 55 via feedthrus 77 to heat filament 55 and emit electrons 67 therefrom. A high-voltage electric potential is applied between anode 56 and cathode 60, and the difference therebetween accelerates the emitted electrons 67 from cathode 60 to anode 56. The electrons 67 impinge the target 57 at the target track 86 and x-rays 69 emit therefrom and pass through passageway 52. During operation, stray electrons from cathode 60 may strike collector 53, thereby increasing the temperature in joint 66.

Figure 3:
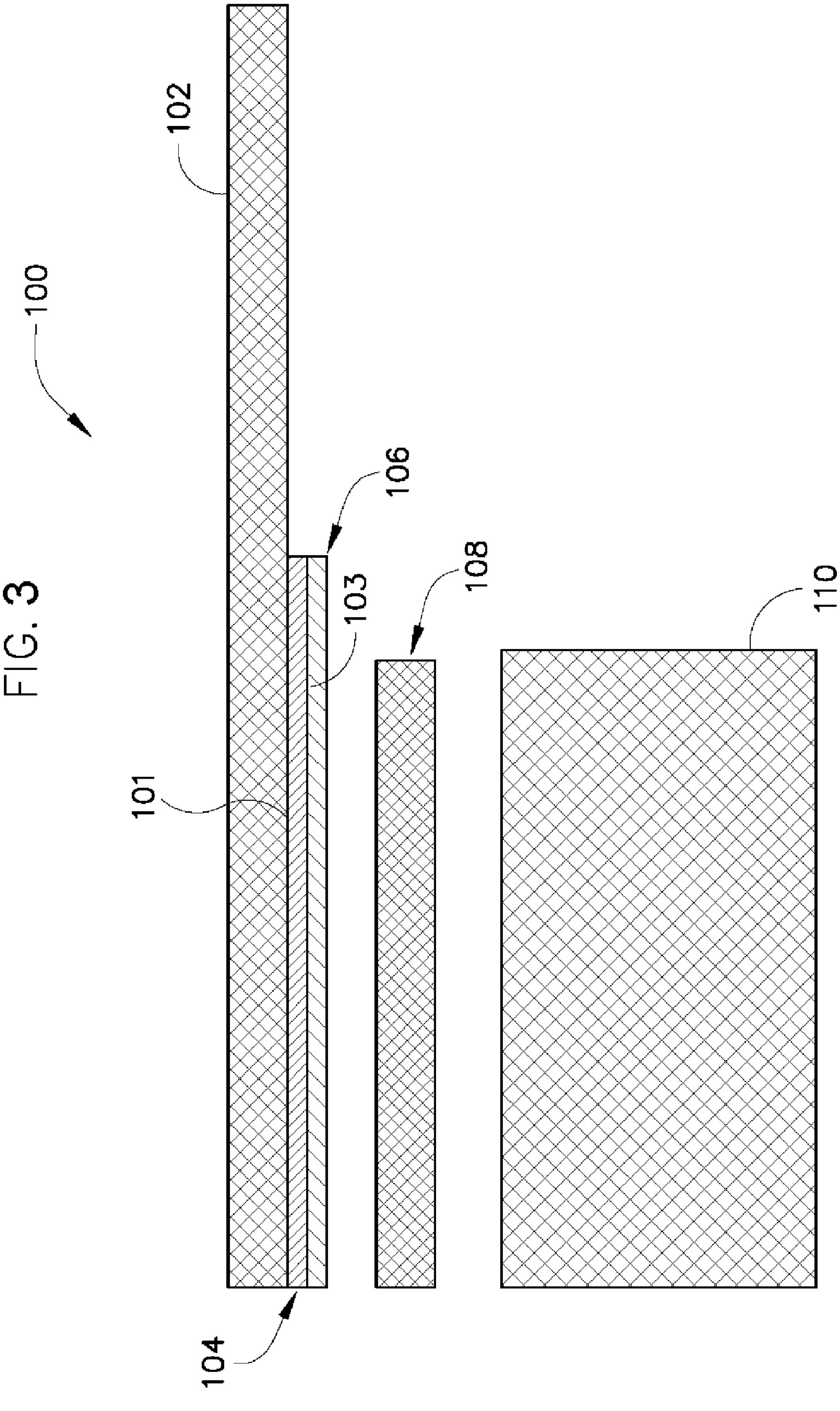
FIG. 3 is a schematic diagram of a braze assembly with two diffusion barriers according to an embodiment of the invention.

A solder or braze assembly 100 is illustrated in FIG. 3 according to an embodiment of the invention. Assembly 100 includes a substrate 102 that includes beryllium or an alloy thereof, with a first diffusion barrier 104 of silver applied to a surface 101 of the substrate 102. Assembly 100 also includes a second diffusion barrier 106 applied to the surface 103 of first diffusion barrier 104. It is contemplated that second diffusion barrier 106 may include gold, nickel, platinum, palladium, chromium, or manganese. The assembly 100 includes an object or member 110 and a fusible material 108 having a liquidus temperature below 760° C. In one embodiment material 108 is Cusiltin-10. Cusil® is a registered trademark of Morgan Crucible Company of Berkshire, England. Material 108 is disposed between second diffusion barrier 106 and member 110. Member 110 may include any metal for removing heat, and in embodiments of the invention, includes copper, stainless steel, Kovar, or a nickel-plated substrate as examples.

First diffusion barrier layer 104 may be applied to substrate 102 using chemical vapor deposition, physical vapor deposition, electroplating, and the like. Second diffusion barrier layer 106 may likewise be applied to first diffusion barrier layer 104 using chemical vapor deposition, physical vapor deposition, electroplating, and the like. In the illustrated embodiment, silver is selected as the first diffusion barrier 104 material because, at or below 760° C., silver and beryllium do not form brittle Laves phase intermetallics at an interface therebetween. However, copper-silver based alloys with liquidus temperatures below 760° C. such as Cusiltin-10 would tend to dissolve the silver within first diffusion barrier 104, thus forming Laves phase intermetallics between the copper constituent of the material 108 and the substrate 102. As such, the second diffusion barrier 106, which may be gold or nickel, is included to prevent the silver from dissolving in the braze alloy. Thus, at or below 760° C., neither gold nor nickel will interact with the silver diffusion barrier or interact with the braze alloy to form Laves phase intermetallics at the interfaces therebetween.

Figure 4:
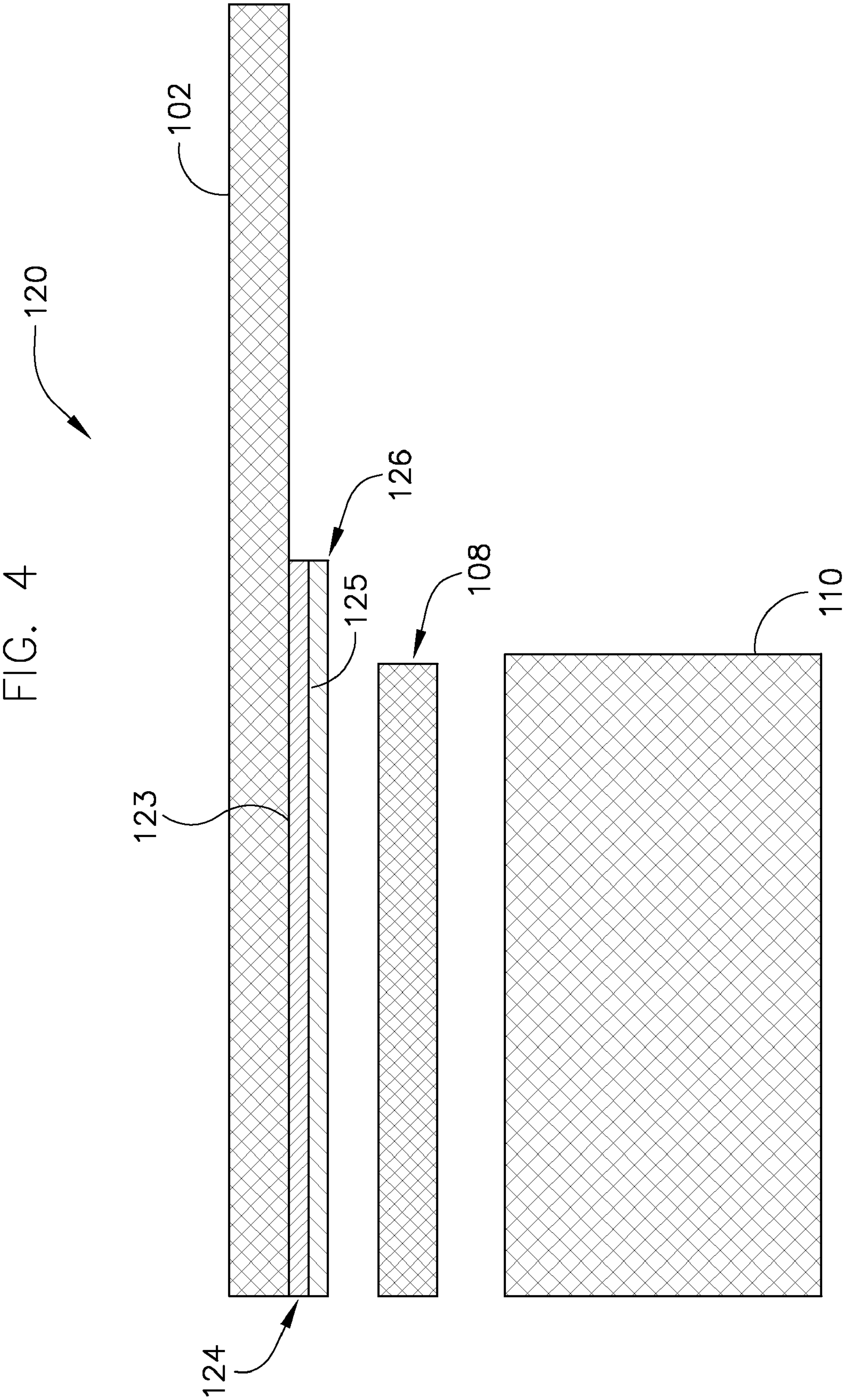
FIG. 4 is a schematic diagram of another braze assembly with two diffusion barriers according to an embodiment of the invention.

An assembly 120 is illustrated in FIG. 4 according to another embodiment of the invention. Assembly 120 includes substrate 102 with a first diffusion barrier 124 of aluminum applied to a surface 125 of the substrate 102. Assembly 120 also includes a second diffusion barrier 126 constructed of, for example, cobalt or nickel. Second diffusion barrier 126 is applied to a surface 125 of first diffusion barrier 124. Fusible material 108 with melting point below that of the aluminum-beryllium eutectic (~644° C.), is disposed between second diffusion barrier 126 and member 110.

First diffusion barrier 124 may be applied to the surface 123 of substrate 102 using chemical vapor deposition, physical vapor deposition, electroplating, and the like. Second diffusion barrier 126 may likewise be applied to the surface 125 of first diffusion barrier 124 using chemical vapor deposition, physical vapor deposition, electroplating, and the like. Aluminum is selected as a first diffusion barrier 124 material because, at or below 644° C., aluminum and beryllium do not form brittle Laves phase intermetallics at the interface between the two materials. Second diffusion barrier 126, which may include a transition metal such as cobalt or nickel, will not form brittle Laves phase intermetallics at the aluminum interface nor at the material 108 interface.

Figure 5:
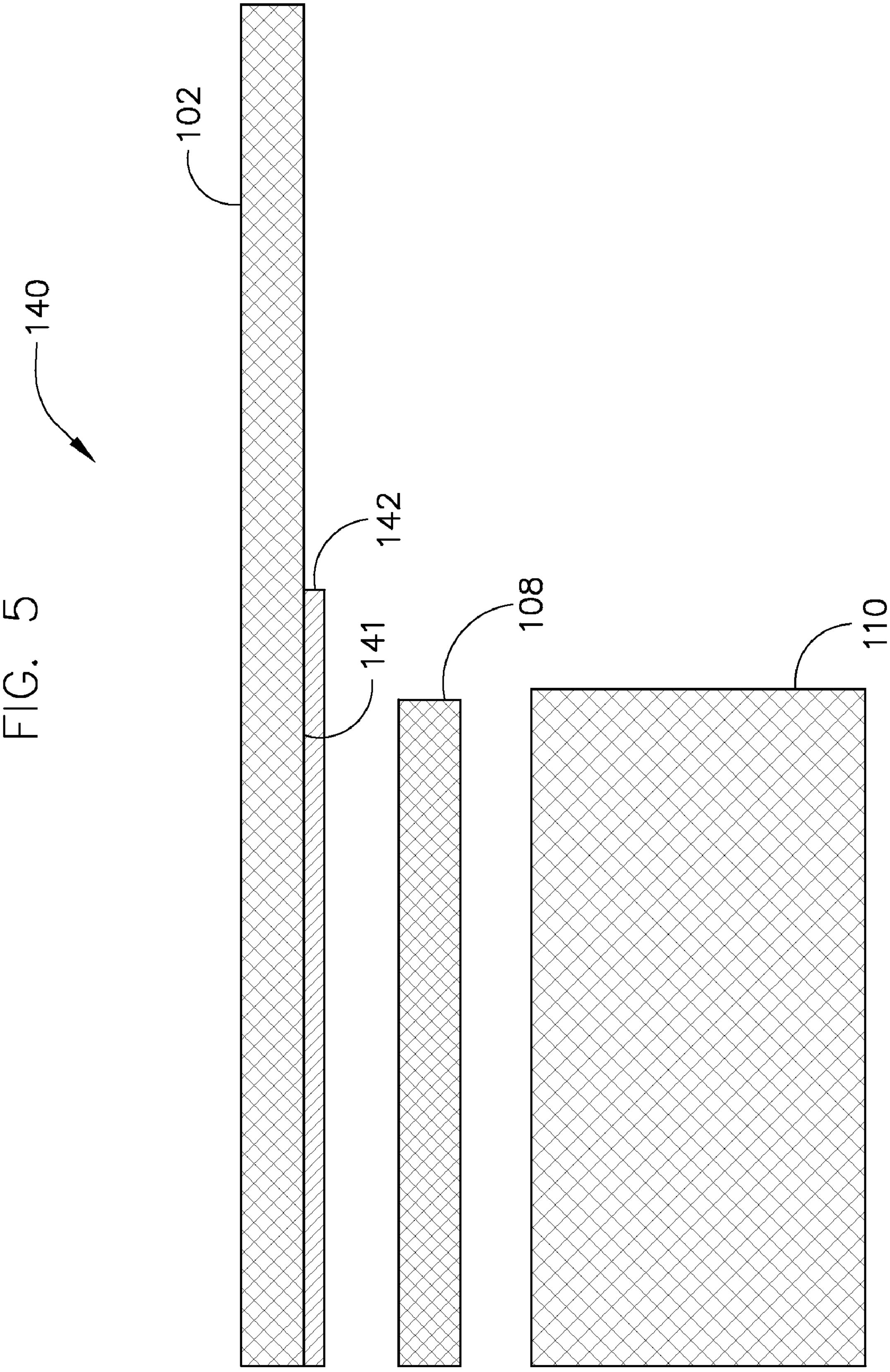
FIG. 5 is a schematic diagram of another braze assembly with a diffusion barrier according to an embodiment of the invention.

Assembly 140 is illustrated in FIG. 5 according to another embodiment of the invention. Assembly 140 includes substrate 102 with a diffusion barrier 142 formed of titanium or chromium and applied to a surface 141 of the substrate 102. Fusible material 108, such as a Cusiltin-10 alloy or other copper-silver based alloys with liquidus temperatures below 760° C., is disposed between diffusion barrier 142 and member 110. Diffusion barrier 142 may be applied to the surface 141 of substrate 102 using chemical vapor deposition, physical vapor deposition, electroplating, and the like. Diffusion barrier 142 prevents formation of Laves phase intermetallic compounds at the interface between diffusion barrier 142 and substrate 102 and also at the interface between diffusion barrier 142 and material 108.

Figure 6:
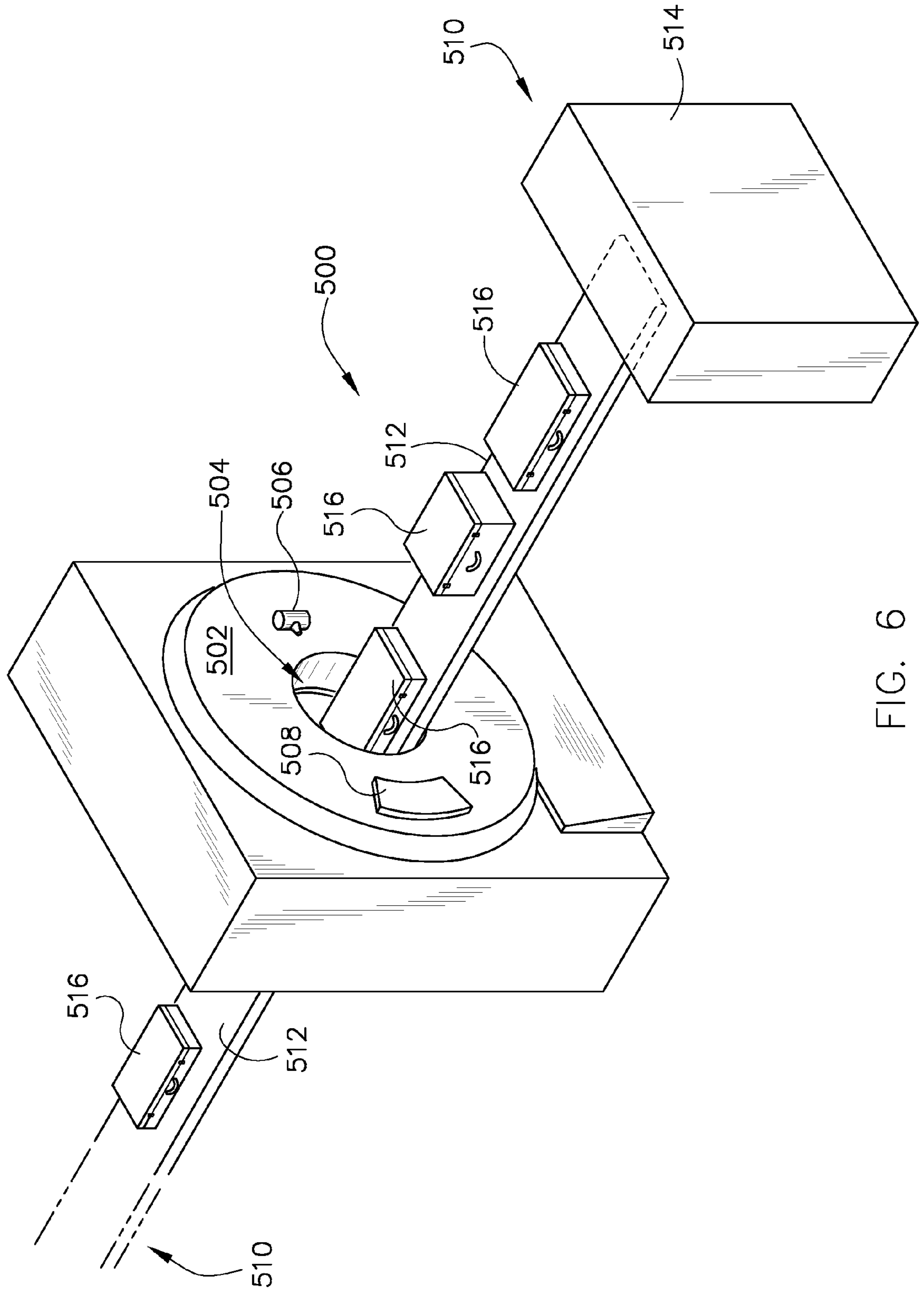
FIG. 6 is a pictorial view of a CT system for use with a non-invasive package inspection system.

Referring now to FIG. 6, package/baggage inspection system 500, having an x-ray tube that incorporates an embodiment of the invention, includes a rotatable gantry 502 having an opening 504 therein through which packages or pieces of baggage may pass. The rotatable gantry 502 houses a high frequency electromagnetic energy source 506 as well as a detector assembly 508. A conveyor system 510 is also provided and includes a conveyor belt 512 supported by structure 514 to automatically and continuously pass objects 516 such as packages or baggage pieces through opening 504 to be scanned. Objects 516 are fed through opening 504 by conveyor belt 512, imaging data is then acquired, and the conveyor belt 512 removes the objects 516 from opening 504 in a controlled and continuous manner. As a result, postal inspectors, baggage handlers, and other security personnel may non-invasively inspect the contents of objects 516 for explosives, knives, guns, contraband, etc.

According to an embodiment of the invention, a bonded assembly includes a member, and a substrate comprising beryllium, the substrate configured to be bonded to the member. The bonded assembly includes a first barrier applied to a surface of the substrate, a second barrier applied to a surface of the first barrier, a bonding material disposed between the second barrier and the member, and wherein the second barrier is configured to prevent dissolution of the first barrier into the bonding material.

In accordance with another embodiment of the invention, a method of fusibly joining a substrate and an object includes providing a substrate comprising beryllium, providing an object configured to be fusibly joined to the substrate, depositing a first barrier layer onto a surface of the substrate, wherein the first barrier layer is configured to prevent formation of intermetallics at an interface between the object and the substrate, and depositing a second barrier layer onto a surface of the first barrier layer. The method further includes interposing a fusible material between the second barrier layer and the object, and heating the assembly to a temperature sufficient to create a fused joint between the substrate and the object via the fusible material.

According to yet another embodiment of the invention, an x-ray tube includes a window comprising beryllium, a collector configured to be braze joined to the window, a first diffusion barrier applied to a surface of the window, the first diffusion barrier configured to prevent formation of Laves phase intermetallics, a second diffusion barrier applied to a surface of the first diffusion barrier, and a braze material disposed between the second diffusion barrier and the collector.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bonded assembly comprising:

a member;

a substrate comprising beryllium, the substrate configured to be fusibly bonded to the member;

a first barrier applied to a surface of the substrate;

a second barrier applied to a surface of the first barrier;

a bonding material disposed between the second barrier and the member; and wherein the second barrier is configured to prevent dissolution of the first barrier into the bonding material.

2. The bonded assembly of claim 1 wherein the first barrier is configured to prevent formation of intermetallics at an interface between the substrate and the member.

3. The bonded assembly of claim 1 wherein the first and second barriers comprise first and second diffusion barriers.

4. The bonded assembly of claim 1 wherein the first barrier comprises silver.

5. The bonded assembly of claim 4 wherein the bonding material has a melting point below 760 degrees Celsius.

6. The bonded assembly of claim 4 wherein the second barrier comprises one of gold, palladium, platinum, nickel, chromium, and manganese.

7. The bonded assembly of claim 1 wherein the first barrier comprises aluminum.

8. The bonded assembly of claim 7 wherein the second barrier comprises one of nickel and cobalt.

9. The bonded assembly of claim 7 wherein the bonding material has a melting point at or below 644 degrees Celsius.

10. The bonded assembly of claim 1 wherein the member comprises one of copper, stainless steel, and Kovar.

11. A method of fusibly joining a substrate and an object comprising:

providing a substrate comprising beryllium;

providing an object configured to be fusibly joined to the substrate;

depositing a first barrier layer onto a surface of the substrate, wherein the first barrier layer is configured to prevent formation of intermetallics at an interface between the object and the substrate;

depositing a second barrier layer onto a surface of the first barrier layer;

interposing a fusible material between the second barrier layer and the object; and heating the assembly to a temperature sufficient to create a fused joint between the substrate and the object via the fusible material.

12. The method of claim 11 wherein depositing a first barrier layer onto a surface of the substrate comprises depositing one of an aluminum layer and a silver layer onto a surface of the substrate.

13. The method of claim 12 wherein, when depositing the first barrier layer comprises depositing an aluminum layer, depositing the second barrier layer comprises depositing one of a nickel layer and a cobalt layer onto the surface of the first barrier layer.

14. The method of claim 12 wherein, when depositing the first barrier layer comprises depositing a silver layer, depositing the second barrier layer comprises depositing one of a gold layer, a platinum layer, a nickel layer, a palladium layer, a manganese layer, and a chromium layer onto the surface of the first barrier layer.

15. The method of claim 12 wherein, when depositing the first barrier layer comprises depositing a silver layer, interposing a fusible material comprises interposing a Cusiltin-10 alloy between the second barrier layer and the object.

16. The method of claim 11 wherein depositing the first barrier layer comprises depositing the first barrier layer via one of a physical vapor deposition process, a chemical vapor deposition process, and an electroplating process; and wherein depositing the second layer comprises depositing the second layer via one of a physical vapor deposition process, a chemical vapor deposition process, and an electroplating process.

17. An x-ray tube comprising:

a window comprising beryllium;

a collector braze joined to the window;

a first diffusion barrier applied to a surface of the window, the first diffusion barrier configured to prevent formation of Laves phase intermetallics;

a second diffusion barrier applied to a surface of the first diffusion barrier; and a braze material disposed between the second diffusion barrier and the collector.

18. The x-ray tube of claim 17 wherein the second diffusion barrier is configured to prevent dissolution of the first diffusion barrier into the braze material.

19. The x-ray tube of claim 17 wherein the braze material comprises a copper-silver based braze alloy having a liquidus temperature below 760° C.

20. The x-ray tube of claim 17 wherein the first diffusion barrier comprises a silver diffusion barrier, and wherein the braze material has a melting point at or below 760 degrees Celsius.

21. The x-ray tube of claim 20 wherein the second diffusion barrier comprises one of gold, nickel, palladium, platinum, chromium, and manganese.

22. The x-ray tube of claim 17 wherein the first diffusion barrier comprises an aluminum diffusion barrier, and wherein the braze material has a melting point at or below 644 degrees Celsius.

23. The x-ray tube of claim 22 wherein the second diffusion barrier comprises a transition metal comprising one of nickel and cobalt.

24. The x-ray tube of claim 17 wherein the collector comprises one of copper, stainless steel, and Kovar.

* * * * *